US012657551B2

(12) United States Patent
Ballard et al.

(10) Patent No.: US 12,657,551 B2
(45) Date of Patent: Jun. 16, 2026

(54) MANAGING DEVICE PERSONALITY AT AN INFORMATION HANDLING SYSTEM

(71) Applicant: Dell Products L.P., Round Rock, TX (US)

(72) Inventors: Lee E. Ballard, Georgetown, TX (US); Deepaganesh Paulraj, Bangalore (IN); Jonathan Foster Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 18/413,230

(22) Filed: Jan. 16, 2024

(65) Prior Publication Data

US 2025/0232255 A1 Jul. 17, 2025

(51) Int. Cl.
G06Q 10/087 (2023.01)

(52) U.S. Cl.
CPC .................................. G06Q 10/087 (2013.01)

(58) Field of Classification Search
CPC ...................................................... G06Q 10/087
See application file for complete search history.

(56) References Cited

U.S. PATENT DOCUMENTS

2003/0222141 A1* 12/2003 Vogler ................. G06Q 10/087
235/385

2014/0201001 A1* 7/2014 Rellas ................. G06Q 30/0261
705/26.25
2023/0134214 A1* 5/2023 N ......................... G06F 16/2255
705/28
2025/0124401 A1* 4/2025 Prasad ................. G06Q 10/087

OTHER PUBLICATIONS

DMTF's Platform Level Data Model (PLDM) for File Transfer Specification, DSP0242, Version: 0.8.0, Date Jan. 24, 2024; 54 pages.
DMTF's Platform Level Data Model (PLDM) for Firmware Update Specification, DSP0267, Version: 1.3.0, Date Dec. 13, 2023; 105 pages.

* cited by examiner

*Primary Examiner* — Garcia Ade
(74) *Attorney, Agent, or Firm* — McDermott Will & Schulte LLP

(57) ABSTRACT

Managing device personality, including performing an inventory analysis of devices at an information handling system, including identifying a current personality file associated with a particular device; receiving data indicating a group of personality files; receiving user input indicating a selection of a particular personality file to be associated with the particular device; in response to receiving the user input, updating the current personality file associated with the particular device by applying the particular personality file at the particular device; after the updating, performing an additional inventory analysis of the devices to determine an active personality file of each of the devices; receiving, in response to performing the additional inventory analysis of the devices, input from the particular device indicating the active personality file of the particular device as the particular personality file; providing data indicating the active personality file of the particular device as the particular personality file.

20 Claims, 4 Drawing Sheets

MANAGING DEVICE PERSONALITY AT AN INFORMATION HANDLING SYSTEM

BACKGROUND

Field of the Disclosure

The disclosure relates generally to an information handling system, and in particular, managing device personality of devices at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing device personality, including performing, at a first time, an inventory analysis of devices at an information handling system, including identifying a current personality file associated with a particular device of the devices; receiving data indicating a group of personality files; receiving user input indicating a selection of a particular personality file of the group of personality files to be associated with the particular device; in response to receiving the user input, updating the current personality file associated with the particular device by applying the particular personality file at the particular device; after the updating, performing, at a second time after the first time, an additional inventory analysis of the devices to determine an active personality file of each of the devices; receiving, in response to performing the additional inventory analysis of the devices, input from the particular device indicating the active personality file of the particular device as the particular personality file; and providing data indicating the active personality file of the particular device as the particular personality file to the user.

Other embodiments of these aspects include corresponding systems, apparatus, and computer programs, configured to perform the actions of the methods, encoded on computer storage devices.

These and other embodiments may each optionally include one or more of the following features. For instance, in response to receiving the user input, rebooting the particular device. After rebooting the particular device, performing, at the second time, the additional inventory analysis of the devices. Applying the particular personality file at the particular device further includes transferring the particular personality file to the particular device. The personality file is below a configuration layer of the particular device and above a hardware layer of the particular device. Each of the personality files of the group of personality files is associated with a particular computing platform. The particular personality file is signed by a first entity associated with the information handling system and a second entity associated with the particular device. The particular personality file includes attributes that are configured as a group associated with the particular device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
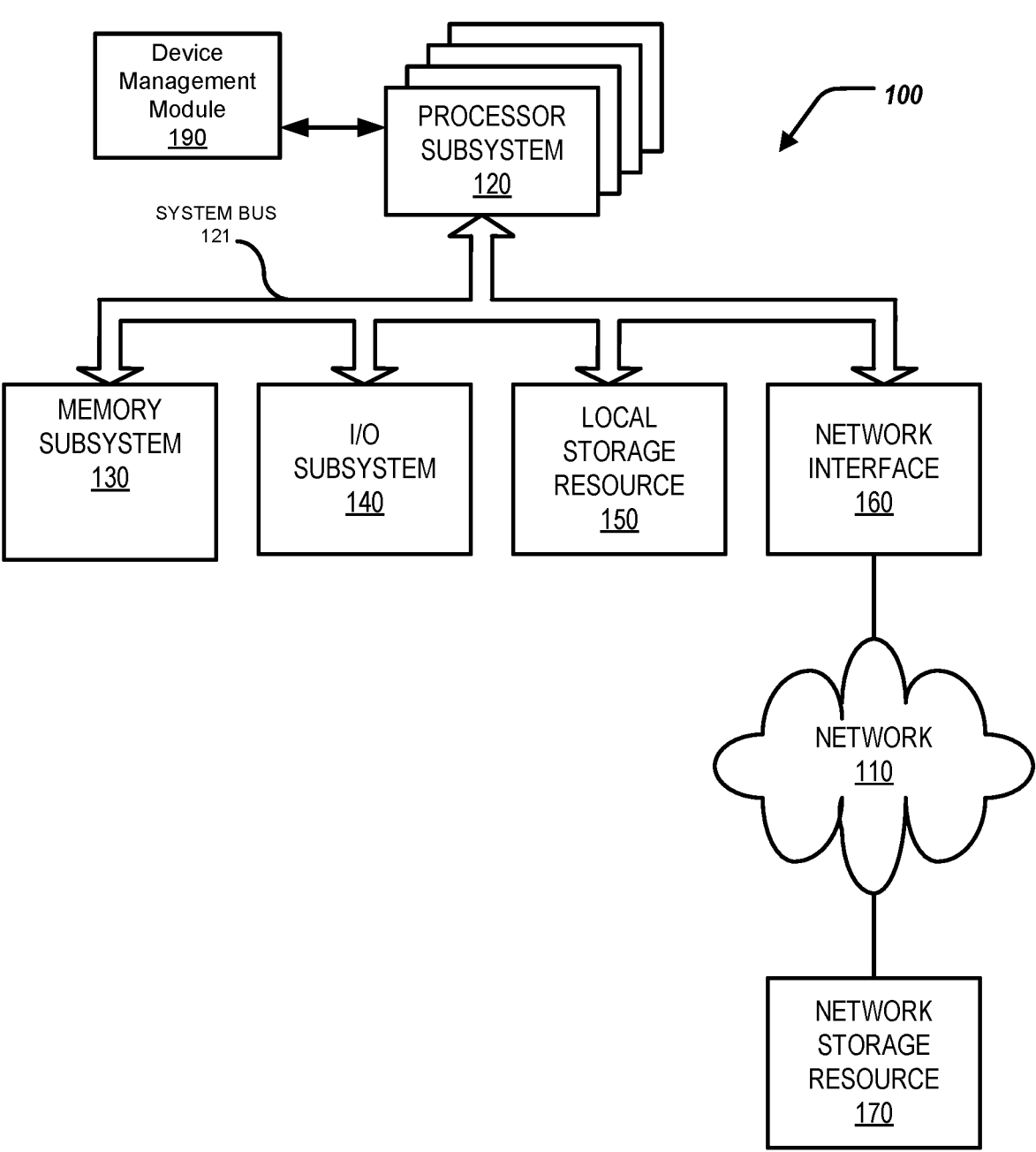
FIG. 1 is a block diagram of selected elements of an embodiment of an information handling system.

This disclosure discusses methods and systems for managing device personality at an information handling system. Specifically, this disclosure discusses a system and a method for managing device personality, including performing, at a first time, an inventory analysis of devices at an information handling system, including identifying a current personality file associated with a particular device of the devices; receiving data indicating a group of personality files; receiving user input indicating a selection of a particular personality file of the group of personality files to be associated with the particular device; in response to receiving the user input, updating the current personality file associated with the particular device by applying the particular personality file at the particular device; after the updating, performing, at a second time after the first time, an additional inventory analysis of the devices to determine an active personality file of each of the devices; receiving, in response to performing the additional inventory analysis of the devices, input from the particular device indicating the active personality file of the particular device as the particular personality file; and providing data indicating the active personality file of the particular device as the particular personality file to the user.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a device management module 190. The device management module 190 can be in communication with the processor subsystem 120, or included by the processor subsystem 120. In some examples, the device management module 190 is included by an embedded controller (EC) of the information handling system 100. In some examples, the device management module 190 is included by baseband management controller of the information handling system 100.

Figure 2:
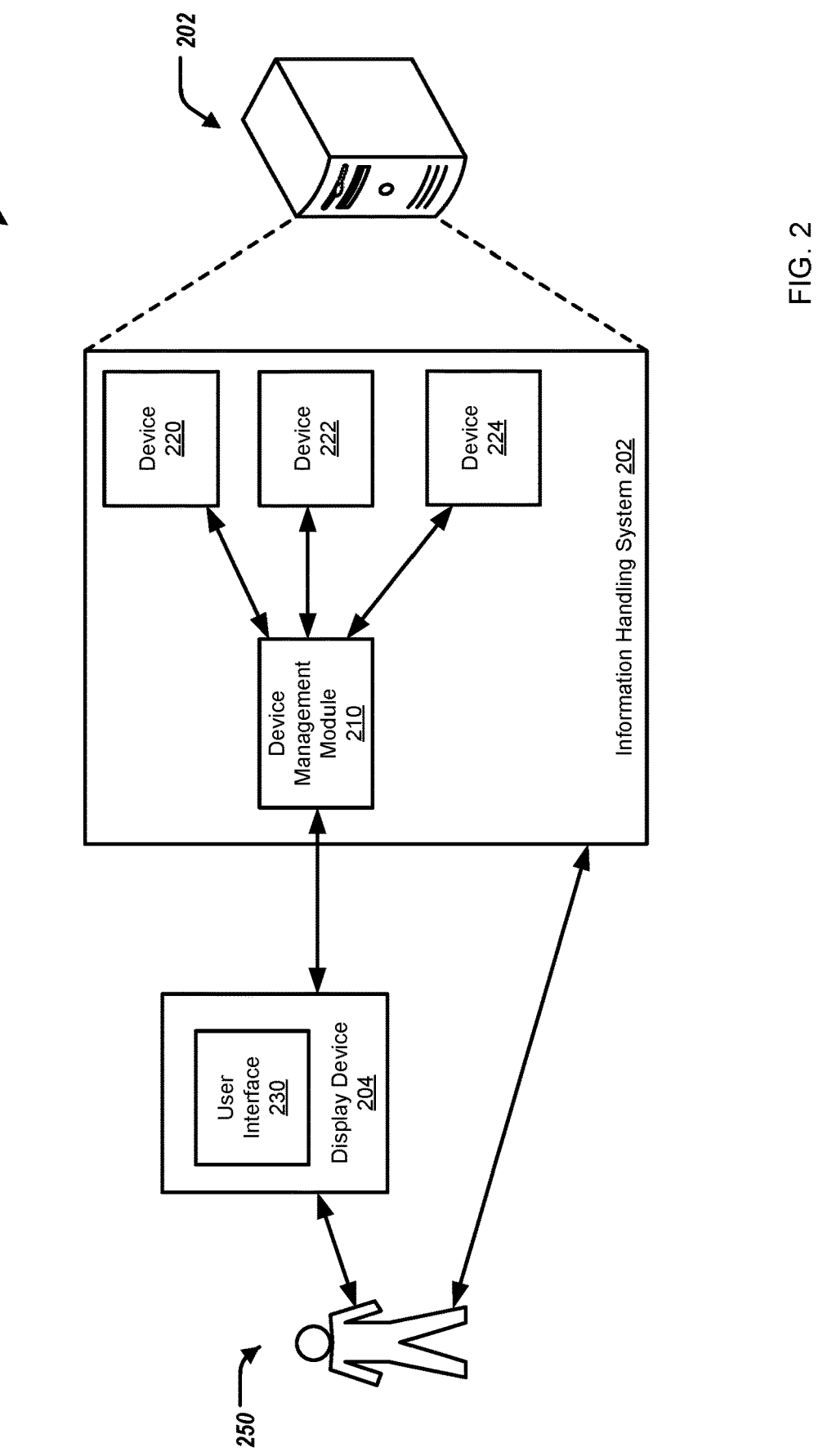
FIG. 2 illustrates a block diagram of an information handling system for managing device personality.

Turning to FIG. 2, FIG. 2 illustrates an environment 200 including an information handling system 202 and a display device 204. The information handling system 202 can include a device management module 210 and devices 220, 222, 224 (however, the information handling system 202 can include any number of devices). In some examples, the information handling system 202 is similar to, or includes, the information handling system 100 of FIG. 1. In some examples, the device management module 210 is the same, or substantially the same, as the device management module 190 of FIG. 1.

The device management module 210 can be in communication with the devices 220, 222, 224; and in communication with the display device 204. The devices 220, 222, 224 can be any devices that can be coupled to the information handling system 202, e.g., via an expansion slot of a motherboard of the information handling system 202. For example, the devices 220, 222, 224 can include peripheral component interconnect express (PCIe) devices.

A user 250 can interact with the information handling system 202, e.g., via the display device 204, and/or other input devices of the information handling system 202.

Figure 3:
FIG. 3 illustrates a swim-lane diagram of managing device personality.

FIG. 3 illustrates a swim-lane diagram depicting selected elements of an embodiment of a method 300 for managing device personality. The method 300 may be performed by the information handling system 100, the information handling system 202, the device management module 210, and with reference to FIGS. 1-2. It is noted that certain operations described in method 300 may be optional or may be rearranged in different embodiments.

The device management module 210, at a first time, performs an inventory analysis of the devices 220, 222, 224. In particular, the device management module 210 performs the inventory analysis by identifying a current personality file associated with the devices 220, 222, 224. In the current example, the device management module 210 identifies a current personality file of the device 220. In some examples, the device management module 210 can provide a request to the device 220 for data regarding the current personality file associated with the device 220, at step A. In some examples, the device management module 210 can store the current personality file of the device 220 or have access to information stored at a storage device and in communication with the device management module 210 indicating the current personality file associated with the device 220.

In some examples, the device 220, in response to the request from the device management module 210, can provide data indicating the current personality file associated with the device 220 to the device management module 210, at step B. In some examples, the device management module 210 can identify the current personality file associated with the device 220 from a storage device in communication with the device management module 210.

In some examples, the device management module 210 can perform the inventory analysis of the devices 220, 222, 224 when information handling system 202 is booted.

In some examples, the personality file includes attributes that are configurable as a group and associated with the device 220. The personality file can include visible, hidden, or both, attributes. The personality file is below a firmware level of the device 220 and is separate from user configuration. In some examples, the personality file is below the configuration layer of the device 220 and above a hardware layer of the device 220. More specifically, the personality file is not permanently fixed/attached to the device 220 as a hardware identifier and does not get reset with other configurations of the device 220. The personality file is not tied to a configuration of the device 220 and is runtime configurable. The personality file is not bound to a part number of the device 220.

The device management module 210 can receive data indicating a group of personality files, at step C. In some examples, each of the personality files of the group of personality files is associated with a particular computing platform (or manufacturer of the device 220). In some examples, for each device 220, 222, 224, there is a single grouping of personality files, where each personality file of the single grouping corresponds to a different manufacture of the respective device. The version of the grouping of the personality files is linear. In other words, a greater group version number would be an update to the group of personality files and a lower group number would be a rollback to the group of personality files.

In some examples, the attributes of the personality files can include such attributes as support for network controller sideband interface (NC-SI) original equipment manufacturer (OEM) commands for closed loop thermals, inventory, input/output (I/O) identity, baseband management controller (BMC) connection view, firmware (FW) lockdown, and similar. The attributes of the personality files can include solution identification (ID) (such as VMWare Solution ID) to configure a data processing unit (DPU). The attributes of the personality files can include peripheral component interconnect express (PCIe) vital product data (VPD) information. The attributes of the personality files can include field replaceable unit (FRU) information. The attributes of the personality files can include solution level features tied to a stock keeping unit (SKU) of the device 220. The attributes of the personality files can include default configuration and reset to default configuration.

In some examples, the personality files can include metadata indicating to the device management module 210 how to apply the personality files such as unified extensible firmware interface (UEFI) firmware management protocol (FMP) update; platform level data model (PLDM) firmware (FW) update; PLDM file; and data processing unit (DPU) boot to baseband management controller (BMC).

The personality files can be retained by the device management module 210 (similar to firmware updates and rollback firmware to enable part replacement).

The device management module 210 can provide data to the display device 204 indicating the group of personality files, at step D. That is, the display device 204 can provide for display on the user interface 230 data indicating the grouping of the personality files available at the device 220. The group of personality files can be presented on the user interface 230 as options for the user 250 to select. The device management module 210 can receive user input indicating the selection of a particular personality file of the group of personality files to be associated with the device 220, at step E.

The device management module 210, in response to receiving the user input selecting the particular personality file, updates the current personality file associated with the device 220, at step F. In particular, the device management module 210 applies the particular personality file at the device 220. For example, the device management module 210 can update an internal record of the personality file of the device 220 to the particular personality file. For example, the device management module 210 can provide data including the particular personality file as the current personality file of the device 220 to a storage device in communication with the device management module 210.

In some examples, the device management module 210 can apply the particular personality file at the device 220 by transferring the particular personality file to the particular device 220, at step G. That is, based on how the personality file is applied at the device 220 as the current personality file, the device management module 210 can transfer the particular personality file to the device 220.

In some examples, the user 250 can create a computational task to update the personality file associated with the device 220 to the particular personality file. In some examples, the computational task is generated and a reboot of the device 220 is needed to apply the particular personality file as the current personality file of the device 220. That is, in response to receiving the user input indicating the particular personality file as the current personality file, the device 220 is rebooted, at step H.

The device management module 210, after updating the current personality file associated with the device 220 to the particular personality file, performs, at a second time after the first time, an additional inventory analysis of the devices to determine an active personality of each of the devices. In particular, the device management module 210 performs an additional inventory analysis of the device 220 to determine an active personality of the device 220, at step I. That is, after rebooting the device 220, the device management module 210 performs, at the second time, the additional inventory analysis of the device 220.

The device management module 210 receives, in response to performing the additional inventory analysis of the device 220, input from the device 220 indicating the active personality of the device 220, at step J. The device management module 210 can receive input from the device 220 indicating the active personality of the device 220 as the particular personality.

The device management module 210 can provide data indicating the active personality of the device 220 as the particular personality to the display device 204, as step K. The user interface 230 of the display device 204 can provide for display data indicating the active personality of the device 220 as the particular personality for the user 250.

In some examples, the particular personality file is signed by a first entity associated with the information handling system 202 and a second entity associated with the device 220. For example, the first entity can include a manufacturer of the information handling system 202 and the second entity can include a manufacturer (vendor) of the device 220. To that end, by having the particular personality file signed by the first entity and the second entity ensures that the device 220 is associated with the supported configuration/personality file.

Furthermore, by having the personality file above the hardware level but below the firmware level, the personality file is not undone by a firmware update at the device 220 or a reset to default of the device 220. That is, the personality file can be updated/enhanced independently of the firmware of the device 220 and any licensing associated with the device 220.

Figure 4:
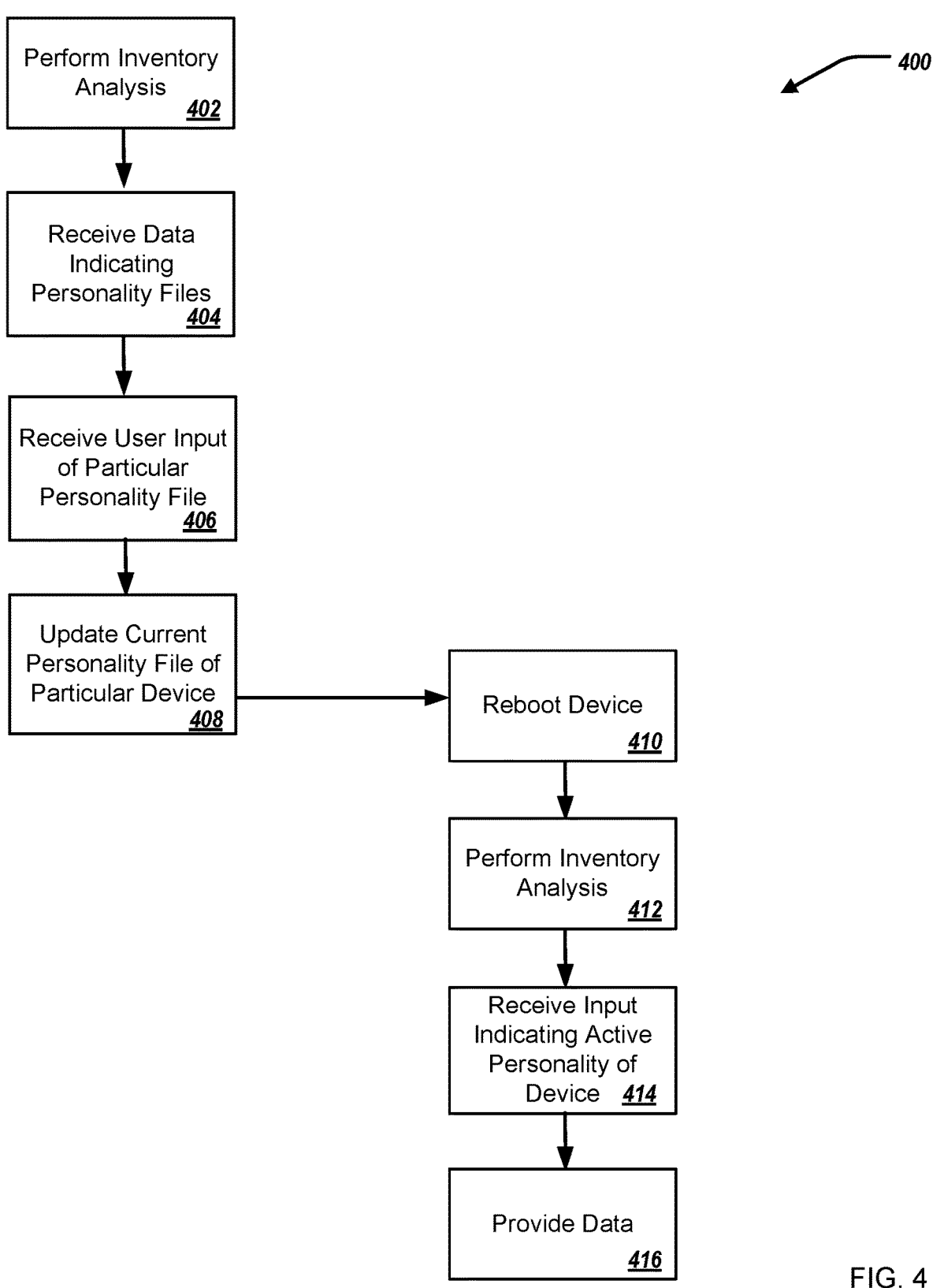
FIG. 4 illustrates a method for managing device personality.

FIG. 4 illustrates a flowchart depicting selected elements of an embodiment of a method 400 for managing device personality. The method 400 may be performed by the information handling system 100, the information handling system 202, the device management module 210, and with reference to FIGS. 1-2. It is noted that certain operations described in method 400 may be optional or may be rearranged in different embodiments.

The device management module 210 performs, at a first time, an inventory analysis of the devices 220, 222, 224 at the information handling system, at 402. Specifically, the device management module 210 identifies a current personality file associated with the device 220. The device management module 210 receives data indicating a group of personality files, at 404. The device management module 210 receives user input indicating a selection of a particular personality file of the group of personality files to be associated with the device 220, at 406. The device management module 210, in response to receiving the user input, updates the current personality file associated with the device 220 by applying the particular personality file at the device 220, at 408. The device management module 210, in response to receiving the user input, reboots the device, at 410. The device management module 210 after the updating, performs, at a second time after the first time, an additional inventory analysis of the devices to determine an active personality file of each of the devices, at 412. The device management module 210 receives, in response to performing the additional inventory analysis of the devices, input from the device 220 indicating the active personality file of the device 220 as the particular personality file, at 414. The device management module 210 provides data indicating the active personality file of the device 220 as the particular personality file to the user 450, at 416.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing device personality, including:

performing, at a first time, an inventory analysis of Peripheral Component Interconnect Express (PCIe) devices at an information handling system, including identifying a current personality file associated with a particular PCIe device of the PCIe devices, the PCIE devices in communication with one or more computing components of the information handling system over a PCIe bus;

receiving data indicating a group of personality files;

receiving user input indicating a selection of a particular personality file of the group of personality files to be associated with the particular PCIe device, the particular personality file including metadata indicating a computer-implemented method of applying the particular personality file at the PCIe device;

in response to receiving the user input, updating the current personality file associated with the particular PCIe device by applying the particular personality file at the particular PCIe device, including applying the particular personality file at the PCIe device over the PCIe bus utilizing the computer-implemented method indicated by the metadata of the particular personality file;

after the updating, performing, at a second time after the first time, an additional inventory analysis of the PCIe devices to determine an active personality file of each of the PCIe devices;

receiving, in response to performing the additional inventory analysis of the PCIe devices, input from the particular PCIe device indicating the active personality file of the particular device as the particular personality file; and providing data indicating the active personality file of the particular PCIe device as the particular personality file to the user, wherein the particular PCIe device operates at the information handling system over the PCIe bus utilizing the particular personality file.

2. The computer-implemented method of claim 1, further including:

in response to receiving the user input, rebooting the particular PCIe device.

3. The computer-implemented method of claim 2, wherein after rebooting the particular PCIe device, performing, at the second time, the additional inventory analysis of the PCIe devices.

4. The computer-implemented method of claim 1, wherein applying the particular personality file at the particular PCIe device further includes transferring the particular personality file to the particular PCIe device.

5. The computer-implemented method of claim 1, wherein the personality file is below a configuration layer of the particular PCIe device and above a hardware layer of the particular PCIe device.

6. The computer-implemented method of claim 1, wherein each of the personality files of the group of personality files is associated with a particular computing platform.

7. The computer-implemented method of claim 1, wherein the particular personality file is signed by a first entity associated with the information handling system and a second entity associated with the particular PCIe device.

8. The computer-implemented method of claim 1, wherein the particular personality file includes attributes that are configured as a group associated with the particular PCIe device.

9. An information handling system comprising a processor having access to memory media storing instructions executable by the processor to perform operations, comprising:

performing, at a first time, an inventory analysis of Peripheral Component Interconnect Express (PCIe) devices at an information handling system, including identifying a current personality file associated with a particular PCIe device of the PCIe devices, the PCIE devices in communication with one or more computing components of the information handling system over a PCIe bus;

receiving data indicating a group of personality files;

receiving user input indicating a selection of a particular personality file of the group of personality files to be associated with the particular PCIe device, the particular personality file including metadata indicating a computer-implemented method of applying the particular personality file at the PCIe device;

in response to receiving the user input, updating the current personality file associated with the particular PCIe device by applying the particular personality file at the particular PCIe device, including applying the particular personality file at the PCIe device over the PCIe bus utilizing the computer-implemented method indicated by the metadata of the particular personality file;

after the updating, performing, at a second time after the first time, an additional inventory analysis of the PCIe devices to determine an active personality file of each of the PCIe devices;

receiving, in response to performing the additional inventory analysis of the PCIe devices, input from the particular PCIe device indicating the active personality file of the particular device as the particular personality file; and providing data indicating the active personality file of the particular PCIe device as the particular personality file to the user, wherein the particular PCIe device operates at the information handling system over the PCIe bus utilizing the particular personality file.

10. The information handling system of claim 9, the operations further including:

in response to receiving the user input, rebooting the particular PCIe device.

11. The information handling system of claim 10, operations further including after rebooting the particular PCIe device, performing, at the second time, the additional inventory analysis of the PCIe devices.

12. The information handling system of claim 9, wherein applying the particular personality file at the particular PCIe device further includes transferring the particular personality file to the particular PCIe device.

13. The information handling system of claim 9, wherein the personality file is below a configuration layer of the particular PCIe device and above a hardware layer of the particular PCIe device.

14. The information handling system of claim 9, wherein each of the personality files of the group of personality files is associated with a particular computing platform.

15. The information handling system of claim 9, wherein the particular PCIe personality file is signed by a first entity associated with the information handling system and a second entity associated with the particular PCIe device.

16. The information handling system of claim 9, wherein the particular personality file includes attributes that are configured as a group associated with the particular PCIe device.

17. A non-transitory computer-readable medium storing software comprising instructions executable by one or more computers which, upon such execution, cause the one or more computers to perform operations comprising:

performing, at a first time, an inventory analysis of Peripheral Component Interconnect Express (PCIe) devices at an information handling system, including identifying a current personality file associated with a particular PCIe device of the PCIe devices, the PCIE devices in communication with one or more computing components of the information handling system over a PCIe bus;

receiving data indicating a group of personality files;

receiving user input indicating a selection of a particular personality file of the group of personality files to be associated with the particular PCIe device, the particular personality file including metadata indicating a computer-implemented method of applying the particular personality file at the PCIe device;

in response to receiving the user input, updating the current personality file associated with the particular PCIe device by applying the particular personality file at the particular PCIe device, including applying the particular personality file at the PCIe device over the PCIe bus utilizing the computer-implemented method indicated by the metadata of the particular personality file;

after the updating, performing, at a second time after the first time, an additional inventory analysis of the PCIe devices to determine an active personality file of each of the PCIe devices;

receiving, in response to performing the additional inventory analysis of the PCIe devices, input from the particular PCIe device indicating the active personality file of the particular device as the particular personality file; and providing data indicating the active personality file of the particular PCIe device as the particular personality file to the user, wherein the particular PCIe device operates at the information handling system over the PCIe bus utilizing the particular personality file.

18. The computer-readable medium of claim 17, the operations further including:

in response to receiving the user input, rebooting the particular PCIe device.

19. The information handling system of claim 18, the operations further including after rebooting the particular PCIe device, performing, at the second time, the additional inventory analysis of the PCIe devices.

20. The information handling system of claim 17, wherein applying the particular PCIe personality file at the particular PCIe device further includes transferring the particular personality file to the particular PCIe device.

* * * * *